United States Patent [19]
Giusti

[11] Patent Number: 5,203,225
[45] Date of Patent: Apr. 20, 1993

[54] VEHICLE TRANSMISSION GEARSHIFT FOR PREVENTING ACCIDENTAL ENGAGEMENT

[75] Inventor: Giuseppe Giusti, Casinalbo, Italy
[73] Assignee: Ferrari S.P.A., Modena, Italy
[21] Appl. No.: 840,261
[22] Filed: Feb. 24, 1992

[30] Foreign Application Priority Data

Feb. 28, 1991 [IT]   Italy ................. TO91 A 000141

[51] Int. Cl.$^5$ ............................................. G05G 9/00
[52] U.S. Cl. ..................................... 74/473 R; 74/477
[58] Field of Search ...................... 74/473 R, 475, 476, 74/477

[56] References Cited

U.S. PATENT DOCUMENTS

| | | | |
|---|---|---|---|
| 1,774,026 | 12/1928 | Manville | 74/473 R |
| 1,885,413 | 11/1932 | Cappa | 74/473 R |
| 1,998,034 | 4/1935 | Vandervoort | 74/473 R |
| 2,015,736 | 10/1935 | Vandervoort | 74/473 R |
| 2,057,073 | 10/1936 | Vandervoort | 74/473 R |
| 4,335,623 | 6/1982 | Kronstadt | 74/473 R X |
| 4,507,981 | 4/1985 | Hiraiwa et al. | 74/473 R X |
| 4,539,859 | 9/1985 | Arai et al. | 74/473 R X |
| 4,543,846 | 10/1985 | Inui et al. | 74/473 R X |
| 5,036,721 | 8/1991 | Gugin | 74/477 X |
| 5,036,722 | 8/1991 | Park | 74/476 |

FOREIGN PATENT DOCUMENTS

| | | |
|---|---|---|
| 0066816 | 12/1982 | European Pat. Off. . |
| 0435832 | 7/1991 | European Pat. Off. . |
| 1245759 | 7/1967 | Fed. Rep. of Germany . |
| 1755732 | 10/1971 | Fed. Rep. of Germany . |
| 1500367 | 5/1974 | Fed. Rep. of Germany . |
| 2041118 | 9/1980 | United Kingdom . |

*Primary Examiner*—Rodney H. Bonck
*Assistant Examiner*—Ryan W. Massey
*Attorney, Agent, or Firm*—Shlesinger, Arkwright & Garvey

[57] ABSTRACT

A vehicle transmission gearshift, characterized by the fact that the gear selector rod, fitted with an angularly and axially integral drive dog for engaging the gearshift forks, is also fitted in idle manner, against the action of elastic means, with an element axially fixed in relation to the transmission casing in relation to which the selector rod is axially mobile; the axially fixed element being rotated by the drive dog together with the selector rod, and having two radially projecting dogs similar to and angularly offset in relation to the drive dog, for selectively engaging the adjacent gearshift forks on either side of that engaged by the drive dog.

4 Claims, 2 Drawing Sheets

VEHICLE TRANSMISSION GEARSHIFT FOR PREVENTING ACCIDENTAL ENGAGEMENT

BACKGROUND OF THE INVENTION

The present invention relates to a vehicle transmission gearshift.

Gear shifting of a vehicle transmission is effected by rotating a gear selector rod, which in turn rotates a drive dog for selectively engaging, according to its angular position, various shifting forks arranged about the gear selector rod and connected to the transmission gears. The selected gear is engaged by moving the selector rod axially, so as to drive the fork engaged by the drive dog in a predetermined direction, and so engage the transmission gear connected to the fork.

As rotation and axial displacement of the selector rod are normally controlled, via transmission means, by a gearshift lever (e.g. floor type) in the passenger compartment of the vehicle, engagement of the gear may occur before it is fully shifted, especially in the case of sporting type transmissions involving very little movement of the gearshift lever. As a result, the drive dog may engage (albeit partially) two adjacent forks simultaneously, thus simultaneously engaging two different speed gears and so damaging the transmission. Current solutions to the above problem consist in either avoiding too close an arrangement of the forks, thus increasing the size and reducing the response of the gearshift, or providing at least some of the gears with safety devices for preventing undesired engagement, U.S. Pat. Nos. 4,337,673 and 4,120,212, for example, relate to devices for preventing accidental engagement of the reverse gear. These, however, are relatively complex and cumbersome, and, as such, cannot be employed on all the gears.

SUMMARY OF THE INVENTION

It is an object of the present invention to provide a straightforward, compact vehicle transmission gearshift designed to prevent accidental simultaneous engagement of two gears despite the shifting forks being arranged extremely close to one another.

According to the present invention, there is provided a vehicle transmission gearshift, comprising a gear selector rod supported in rotary and axially sliding manner on the transmission casing; a number of shifting forks sliding parallel to and arranged at different angles about the selector rod; and a drive dog projecting radially from and angularly and axially integral with said selector rod, for selectively engaging said forks one at a time and rendering them axially integral with said selector rod; characterized by the fact that it also comprises an axially fixed element in relation to which said selector rod is permitted to move axially; said axially fixed element being connected angularly integral with and rotated integral with said selector rod, and supporting two radially projecting dogs offset angularly on opposite sides of said drive dog, for selectively engaging the adjacent forks on either side of that engaged by the drive dog, and so preventing accidental engagement of other than the selected gear.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
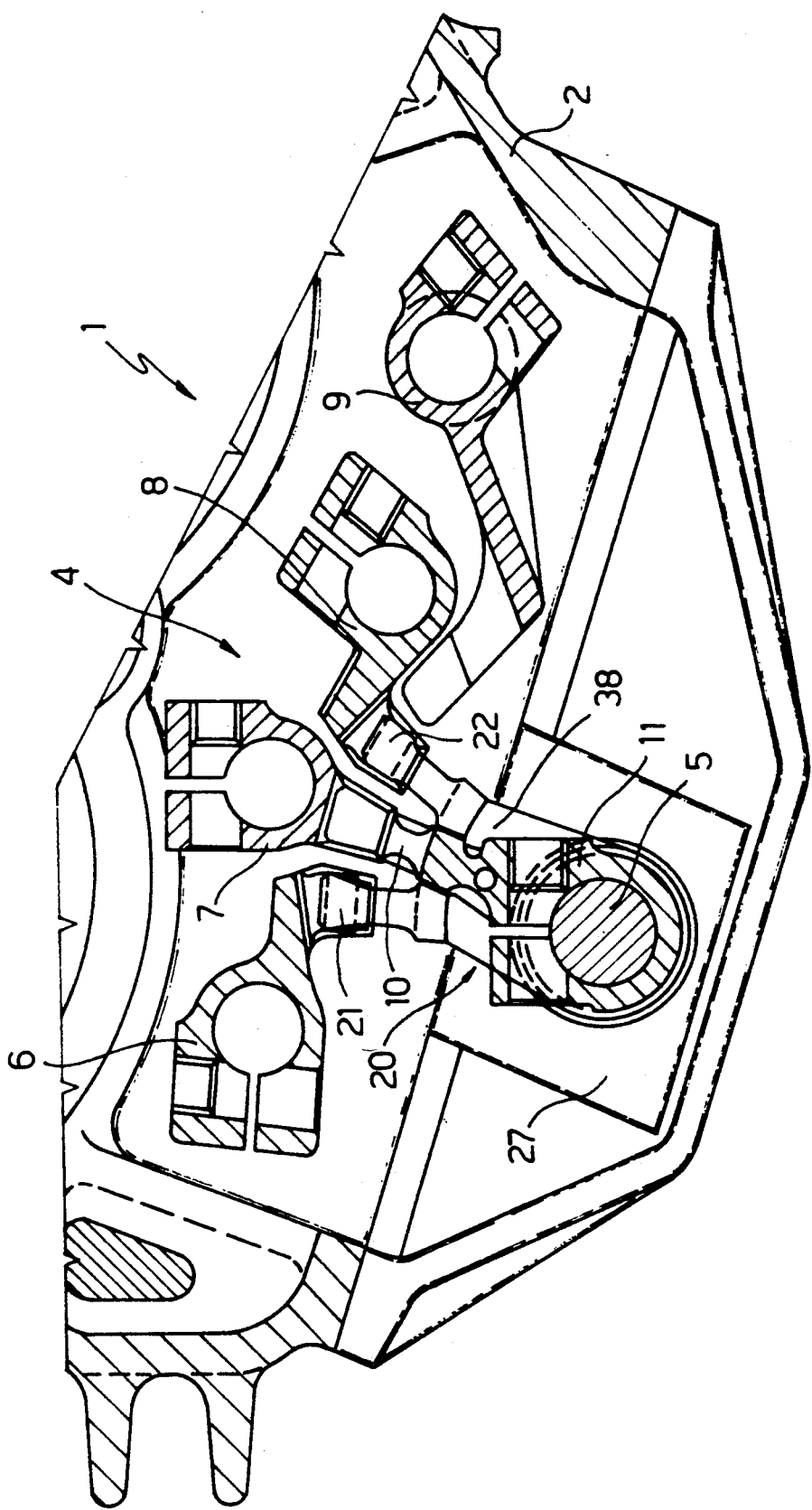
FIG. 1 shows a cross section of a portion of a vehicle transmission featuring a gearshift in accordance with the present invention.
Figure 2:
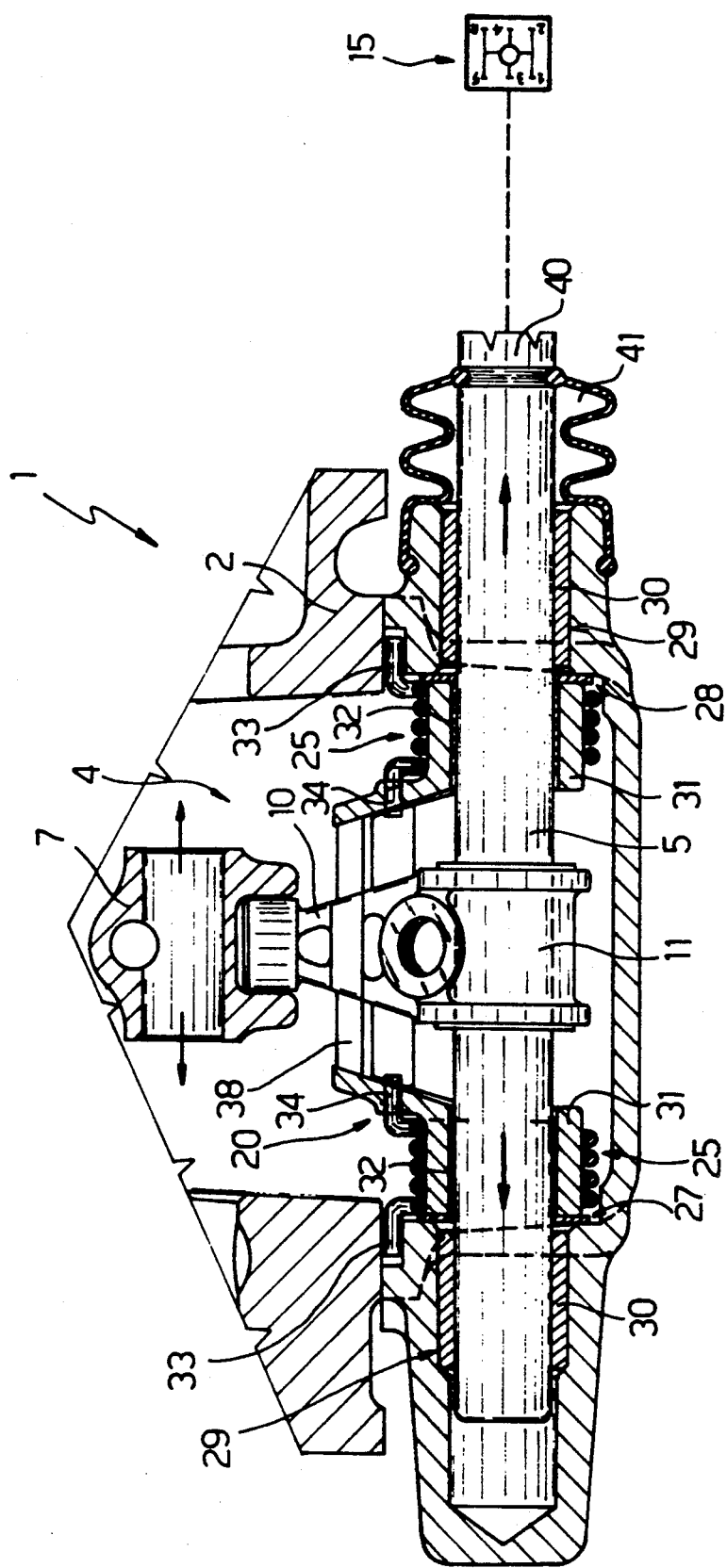
FIG. 2 shows a partially sectioned view of the FIG. 1 gearshift turned 90°.

Number 1 in FIGS. 1 and 2 indicates a known transmission of a known vehicle (not shown). The FIG. 1 and 2 view of transmission 1 is limited to the portion of casing 2 housing a gearshift 4, the known parts of which are shown schematically for clarity. Gearshift 4 comprises a known gear selector rod 5 supported in rotary and axially sliding manner on casing 2; and a number of known shifting forks 6, 7, 8, 9 supported on casing 2, sliding parallel to selector rod 5 on respective known shafts (not shown), and connected in known manner (not shown) to respective gear trains of transmission 1 for obtaining various gear ratios corresponding to various selectable speeds. Forks 6, 7, 8, 9 are arranged at different angles about rod 5, and can be moved axially in the two directions shown by the arrows in FIG. 2, for moving a respective gear train in a given direction, and so shifting to a respective gear of transmission 1. For example, fork 6 provides for shifting to first or second gear, depending on whether it is moved to the left or right in FIG. 2; fork 7 for shifting to third or fourth; fork 8 for shifting to fifth; and fork 9 for shifting to reverse.

Gearshift 4 also comprises a drive dog 10 for forks 6, 7, 8, 9, projecting radially from and angularly and axially integral with selector rod 5, and which may be formed in one piece with rod 5, or, as in the example shown, connected by means of a coupling 11. As shown clearly in FIGS. 1 and 2, when rod 5 is rotated about its axis, dog 10 selectively engages forks 6, 7, 8, 9 one at a time for rendering them axially integral with rod 5. Rod 5 is connected in known manner (not shown), e.g. via Bowden cables or similar transmission means, to a gearshift lever 15 in the passenger compartment of the vehicle (shown schematically by operating block 15 in FIG. 2) for shifting and engaging the gears by respectively rotating and axially displacing rod 5, e.g. by selectively setting lever 15 to any of the six positions indicated 1, 2, 3, 4, 5 and R in operating block 15.

According to the present invention, gearshift 4 also comprises an additional axially fixed element 20 in relation to which selector rod 5 is permitted to move axially, despite being connected angularly integral, for rotating it integral with dog 10. Element 20 supports two radially projecting dogs 21, 22 (not shown in FIG. 2) substantially similar to and coplanar with drive dog 10 in the FIG. 1 plane, but angularly offset on opposite sides of dog 10 so as to form a V with its vertex on the axis of rod 5 as shown in FIG. 1. For any angular position of dog 10, dogs 21 and 22 therefore provide for selectively engaging the adjacent forks on either side of that engaged by dog 10, thus preventing accidental engagement of other than the selected gear. As shown in FIG. 1, for example, when dog 10 engages fork 7, the adjacent forks 6 and 8 on either side of fork 7 are engaged respectively by dogs 21 and 22. According to the present invention, the angular distance between dogs 21, 10 and 22 is substantially equal to that between forks 6, 7, 8 and 9.

As shown by way of example in FIGS. 1 and 2, element 20 is supported idly on selector rod 5 against the action of elastic means 25, and is permanently engaged by drive dog 10 so as to be rotated by the same together with selector rod 5. In particular, element 20 is mounted between and contacting two opposite axial shoulders 27, 28 of casing 2, through which are formed respective sliding seats 29 with respective bearings 30 for selector rod 5. Rod 5 is engaged by opposite sleeve-shaped end portions 31 of element 20 via the interposition of bearings 32 so designed as to be also interposed between portions 31 and shoulders 27, 28, and so act as both sliding bearings between rod 5 and element 20, and thrust bearings for element 20. Elastic means 25 consist of two spiral springs wound about respective end portions 31 of element 20, and having respective opposite ends 33 secured integral with casing 2 at axial shoulders 27, 28, and respective ends 34, opposite ends 33, secured to a central fork-shaped portion 38 of element 20 engaging drive dog 10. A portion 40 of rod 5 projecting from casing 2 towards gearshift lever 15 is protected by a boot 41.

In actual use, operation of gearshift lever 15 rotates rod 5 to set dog 10 to the fork 6, 7, 8, 9 corresponding to the required gear, which is engaged by further operating lever 15 to move rod 5 axially in either of the directions indicated by the arrow in FIG. 2. For example, when dog 10 is positioned as shown in FIG. 1, leftward movement (as viewed in FIG. 2) of rod 5 moves fork 7 to the left to engage third gear, whereas rightward movement moves fork 7 to the right to engage fourth gear. During the above operation, element 20 is rotated by dog 10 together with rod 5, so that, during the first part of the operation, dogs 21 and 22 engage the adjacent forks on either side of fork 7, in this case, forks 6 and 8. As element 20, unlike rod 5, is axially fixed in relation to casing 2, engagement of forks 6, 8 by dogs 21, 22 integral with element 20 locks forks 6, 8, thus preventing accidental engagement of the respective gears. Similarly, when dog 10 engages fork 6 corresponding to first and second gear, fork 7 is engaged and locked by dog 22, while dog 21, having no fork to engage to the left of fork 6, is left free. When fork 8 is engaged by dog 10, forks 7 and 9 are locked respectively by dogs 21 and 22. When fork 9 is engaged by dog 10, fork 8 is locked by dog 21, while dog 22, having no fork to engage to the right of fork 9, is left free.

In the event of the user attempting to engage two gears simultaneously, e.g. partially engaging fork 7 without fully disengaging, for example, fork 6 or 8, by virtue of the aforementioned angular arrangement of dogs 21, 10 and 22, both the forks engaged partially by dog 10 will also be engaged partially and simultaneously by dogs 21 and 22, thus preventing engagement from being effected, in that the forks partially engaged by axially mobile dog 10 are also engaged and locked by one of axially fixed dogs 21, 22, which thus also provide for locking rod 5. Failure to engage the gear therefore provides for indicating improper shifting, which may thus be repeated with no damage to transmission 1.

The advantages of the present invention will be clear from the foregoing description. In addition to being highly straightforward in design and substantially the same size as traditional types, the gearshift according to the present invention provides for preventing accidental engagement of two gears simultaneously, which, among other things, provides for considerably simplifying the mechanical design of transmission 1 by eliminating the safety devices normally provided for this purpose.

I claim:

1. A vehicle transmission gearshift, comprising a gear selector rod supported in rotary and axially sliding manner on the transmission casing; a number of shifting forks sliding parallel to and arranged at different angles about the selector rod; and a drive dog projecting radially from and angularly and axially integral with said selector rod, for selectively engaging said forks one at a time and rendering them axially integral with said selector rod; characterized by the fact that it also comprises an axially fixed element in relation to which said selector rod is permitted to move axially; said axially fixed element being connected angularly integral with and rotated integral with said selector rod, and supporting two radially projecting dogs offset angularly on opposite sides of said drive dog, for selectively engaging the adjacent forks on either side of that engaged by the drive dog, and so preventing accidental engagement of other than the selected gears; and said axially fixed element is mounted between two opposite axial shoulders of the casing, said axially fixed element includes at least one member which extends outwardly from said drive dog along an axis of said selector rod and abuts one of the two opposite axial shoulders of said casing.

2. A gearshift as claimed in claim 1, characterized by the fact that said axially fixed element is supported idly on said selector rod against the action of elastic means.

3. A gearshift as claimed in claim 2, characterized by the fact that said elastic means comprise two spiral springs wound about respective opposite sleeve-shaped portions of said axially fixed element by means of which said axially fixed element is mounted on said selector rod; the respective opposite ends of said spiral springs being secured integral with said axial shoulders and with a central fork-shaped portion of said axially fixed element engaging said drive dog.

4. A gearshift as claimed in claim 1, characterized by the fact that said selector rod is connected to a gearshift lever by which it is rotated and moved axially for effecting gear shift and engagement respectively.

* * * * *